United States Patent
Chang et al.

(10) Patent No.: US 6,968,509 B1
(45) Date of Patent: Nov. 22, 2005

(54) RECORDING OF USER-DRIVEN EVENTS WITHIN A COMPUTER APPLICATION

(75) Inventors: Michael J. Chang, Redmond, WA (US); Li Wen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 10/163,745

(22) Filed: Jun. 5, 2002

(51) Int. Cl.[7] ............................................. G06F 15/00
(52) U.S. Cl. ...................................... 715/802; 715/805
(58) Field of Search ............................. 715/802, 803, 715/804, 805

(56) References Cited

U.S. PATENT DOCUMENTS 5,634,019 A * 5/1997 Koppolu et al. ............ 715/744
6,353,452 B1 * 3/2002 Hamada et al. ............. 715/825

OTHER PUBLICATIONS

Alex Denham, "The Bug Stops Here: On-Site Debugging is Every Developer's Worst Nightmare, But Help is at Hand in the Form of Mutek's Bug Trapper," May, 1999, Article Archive, VSJ. http://www.vsj.co.uk/archive/review-9905.asp.
"AppSight Black Box Software," Black Box Flight Recorders for Software. http://www.mutek.com/technology/blackbox.html.
Kent Phelps, "Complexity Made Simpler: Revelation G, Advanced Revelation," (Data Managers As Development Tools), *PC Tech Journal*, vol. 6, No. 3, Mar. 1988, p. 122.
"Code Analysis, Documentation, and Testing Tools," *1996 Database Buyer's Guide and Client/Server Sourcebook*, vol. 9, No. 6, 1996, pp. 44-47.
"D.Z. Pan and M.A. Linton, Stanford University," Supporting Reverse Execution of Parallel Programs, *SIGPLAN Notices*, vol. 24, No. 1, Jan. 1989, pp. 124-129.
"Vermont Enters WIndows Testing Market-Vermont Creative Software's Vermont HighTest Testing Program;"*Windows-DOS Developer's Journal*, vol. 5, No. 2, Feb. 1994, p. 81.
Oscar Nierstrasz, Simon Gibbs, and Dennis Tsichritzis, "Component-Oriented Software Development," *Communications of the ACM*, vol. 35, No. 9, Sep. 1992, p. 160-165.

* cited by examiner

*Primary Examiner*—Cao (Kevin) Nguyen
(74) *Attorney, Agent, or Firm*—Merchant & Gould

(57) ABSTRACT

Methods, computers, and computer readable media are disclosed for recording user-driven events within an application running on a computer that utilizes a graphical user interface. Changes of focus of the application are detected and entries for the resulting focus are logged. While the changes of focus are being detected, the application is monitored for a window message that signifies user activity. When a window message occurs, the activity of the window message is used to specify the user-driven event. A focus of an entry previously logged may also be obtained and used to specify the user-driven event, such as a mouse click on a specific tool bar button of the graphical user interface. A series of user-driven events can be recorded up to the occurrence of an application malfunction, and then the recorded events can be followed by a user to reproduce the malfunction and begin debugging the application.

20 Claims, 9 Drawing Sheets

| RESULTING FOCUS VIA MOUSE CURSOR | TIME | USER ACTIVITY | RECORD |
|---|---|---|---|
| 'File item' | 1:42.1 | Keyboard: Hello World! <Enter> | Keyboard type: Hello World! <Enter><br>Keyboard type: = rand ( ) <Enter> |
| 'Edit item' | 1:52.3 | Keyboard: <Backspace><br>Keyboard: <Ctrl> A | Keyboard type: <Backspace><br>Keyboard type: <Ctrl> +A |
| 'Format item' | 1:55.8 | Mouse Click | Click [Menu Item] "Format" |
| 'Font item' | 1:57.2 | Mouse Click | Click [Menu Item] "Font..."<br>Window switches to: Font |
| 'Font Color' button | 1:59.5 | | Click [Menu Item] "Font Color" |
| X button | 1:59.6 | Mouse Click | Click [Menu Item] "Font Color"<br>"MSO Generic Control Container" toolbar |

FIG.5

RECORDING OF USER-DRIVEN EVENTS WITHIN A COMPUTER APPLICATION

TECHNICAL FIELD

The present invention is related to recording user-driven events in a computer application. More particularly, the present invention is related to recording user-driven events occurring within a graphical user interface of the computer application.

BACKGROUND

Computer application programs, as they are being developed and tested, often suffer from malfunctions known as bugs. A bug in an application program may cause the application to behave incorrectly or to stop responding altogether. The efficiency of resolving the bug is improved if the bug can be reproduced. Reproducing the bug requires that the user know the sequence of user-driven events that occurred leading up to the occurrence of the bug. Sometimes, a bug results from the culmination of many events happening in a particular sequence and can be nearly impossible to remember.

Furthermore, the person experiencing the bug may not be the same individual who will attempt to debug the application. Therefore, the person experiencing the bug must be able to convey the sequence of events to the person who will attempt to debug the application. Conveying the sequence of events requires not only that the person experiencing the bug recall each of the events, but each event must be conveyed accurately. If the person forgets a particular user-driven event, forgets the particular order of events, or misunderstands a user-driven event that occurred when experiencing the bug, then the user-driven events will not be adequately reproducible. As a result, the bug may not be easily detected and corrected. Thus, automatically recording the user-driven events of an application is necessary to properly reproduce the bug.

However, for applications that operate within a graphical user interface ("GUI"), many of the user-driven events occur through use of a mouse in addition to use of a keyboard. User-driven events include mouse clicks on particular objects of the GUI. Merely recording the X and Y coordinates of a mouse pointer when the click occurs is not helpful because one cannot determine from the X and Y coordinates the object that was actually clicked due to variations in window size, placement, object arrangement, and other factors. Therefore, user-driven events within GUIs are not adequately recorded.

SUMMARY

The present invention records user-driven events within an application of a computer by detecting changes in a focus of the application while monitoring for window messages from the application window to the operating system of the computer. The focus of the application includes where a mouse pointer is located on a graphical user interface of the application, such as a focus on a particular button of a toolbar that causes the button to have a raised appearance. The window message specifies user activity such as a click of a mouse button and pressing of keys on the keyboard. The focus that results from each change of focus is logged. When a window message occurs, a focus that has been logged and the user activity of the window message can be recorded to specify the user-driven event. The user-driven event, such as typing of particular keys or a mouse click at a particular focus can be displayed on the screen and/or saved to a file and later used as an instruction for recreating the bug.

A computer that records user-driven events includes a memory and a processor. The processor executes the application and the graphical user interface provided to the user through a display device. The processor detects the changes of focus of the application and records a focus resulting from each change as an entry to memory. The processor also monitors for a window message specifying user activity while detecting the changes of focus. When a window message occurs, the processor specifies the user-driven event by recording the user activity of the message and also recording a focus of an entry stored in the memory.

A computer readable medium specifies steps to be executed by a computer to record the user-driven events. The steps include detecting a change of focus of an application within a graphical user interface and logging each change of focus that occurs as an entry to memory. While detecting the changes of focus, window messages signifying user activity are monitored, and when a window message occurs, it is determined whether the window message indicates a mouse click or a keyboard type. When a mouse click is indicated, a focus of an entry previously logged is obtained and recorded in association with the user activity of the window message to specify the user-driven event.

The present invention may be more clearly understood and appreciated from a review of the following detailed description and by reference to the drawings and claims.

DESCRIPTION OF THE DRAWINGS

FIG. 5 is a table illustrating the relationship of the entries to the stack, the user activity from the window messages, and the resulting user-driven events that are recorded.

DETAILED DESCRIPTION

Embodiments of the present invention provide a method, computer system, and computer-readable medium for recording user-driven events occurring within an application. In the following detailed description, references are made to the accompanying drawings that form a part hereof, and in which are shown by way of illustration of specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
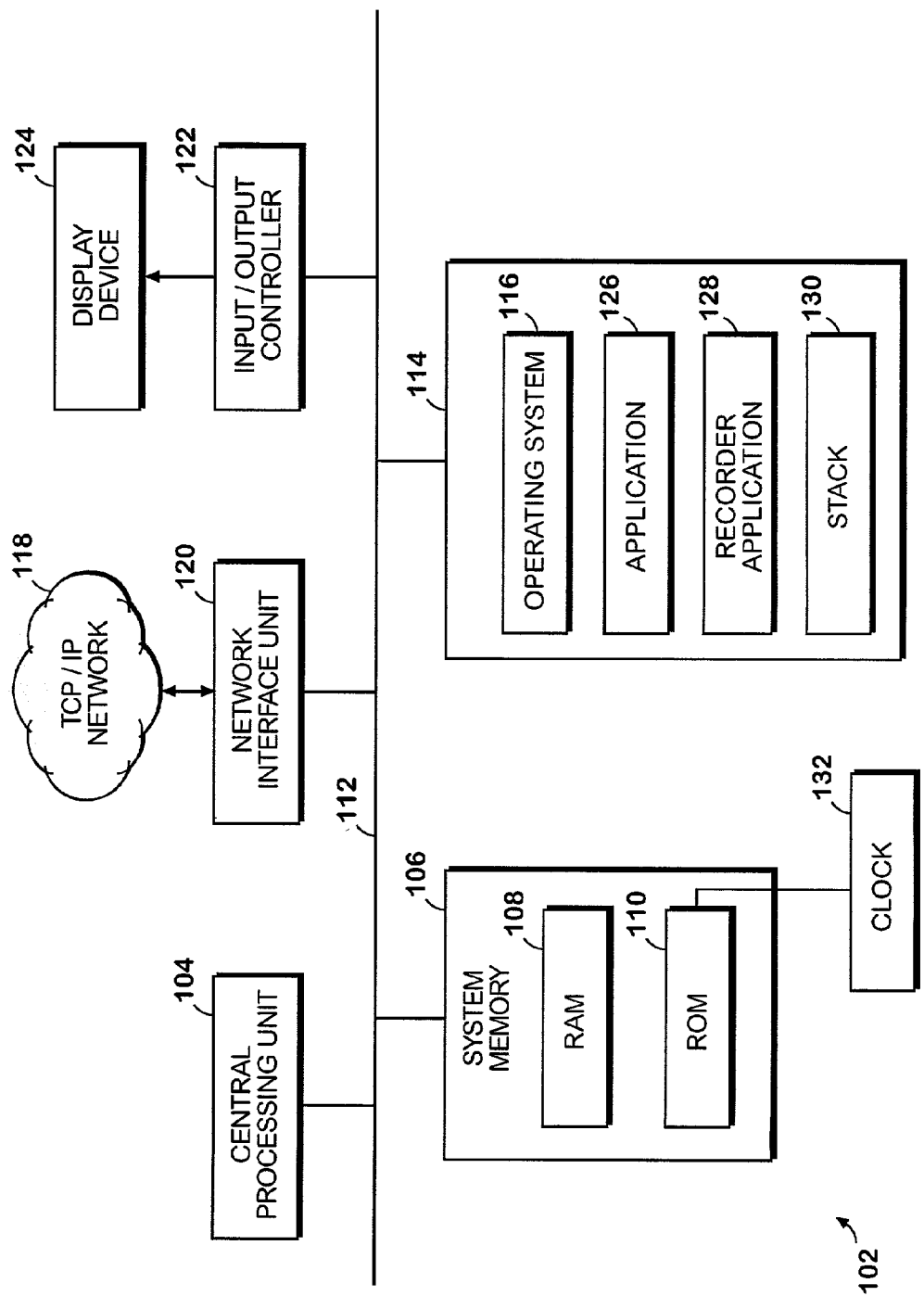
FIG. 1 shows the major components of a computer environment for implementing embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer of FIG. 1 may also be practiced in distributed computing environments where tasks are performed by remote processing devices that are linked through a communications network. In a distributed computing environment, program modules may be located in both local and remote memory storage devices.

FIG. 1 shows an illustrative computer architecture for a personal computer 102 for practicing the various embodiments of the invention. The computer architecture shown in FIG. 1 illustrates a conventional personal computer, including a central processing unit 104 ("CPU"), a system memory 106, including a random access memory 108 ("RAM") and a read-only memory ("ROM") 110, and a system bus 112 that couples the memory to the CPU 104. A basic input/output system containing the basic routines that help to transfer information between elements within the computer, such as during startup, is stored in the ROM 110 which communicates with a real-time clock 132 to provide the time to the system. The personal computer 102 further includes a mass storage device 114 for storing an operating system 116 and application programs, such as the application program 126 where the user-driven events are occurring. The mass storage device 114 also stores the recording application 128 that records the user-driven events, and data such as a stack 130 that stores focus entries for the user-driven events.

The mass storage device 114 is connected to the CPU 104 through a mass storage controller (not shown) connected to the bus 112. The mass storage device 114 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 102 may operate in a networked environment using logical connections to remote computers through a TCP/IP network 118, such as the Internet. The personal computer 102 may connect to the TCP/IP network 118 through a network interface unit 120 connected to the bus 112. It should be appreciated that the network interface unit 120 may also be utilized to connect to other types of networks and remote computer systems. The personal computer 102 may also include an input/output controller 122 for receiving and processing input from a number of devices, including a keyboard or mouse (not shown). Similarly, an input/output controller 122 may provide output to a display screen 124, a printer, or other type of output device.

As mentioned briefly above, a number of program modules and data files may be stored in the mass storage device 114 and RAM 108 of the personal computer 102, including an operating system 116 suitable for controlling the operation of a stand-alone or networked personal computer. The mass storage device 114 and RAM 108 may also store one or more application programs such as the application 126 and recorder application 128.

Embodiments of the present invention provide program modules for use in conjunction with the recorder application program 128. The program modules implement logical operations to record the user-driven events within the application program 126 being used. Various embodiments of the logical operations of the program modules for the recorder application program 126 are discussed below with reference to FIGS. 2–4. Additionally, the structure of a stack 130 of storage 114 that is utilized by the recorder application program 126 is shown in FIG. 5 in conjunction with focus entries of the stack, window messages from the application 126 that are detected, and the resulting user-driven event that is recorded. Screenshots of the recording of user-driven events are provided in FIGS. 6–10.

Figure 2:
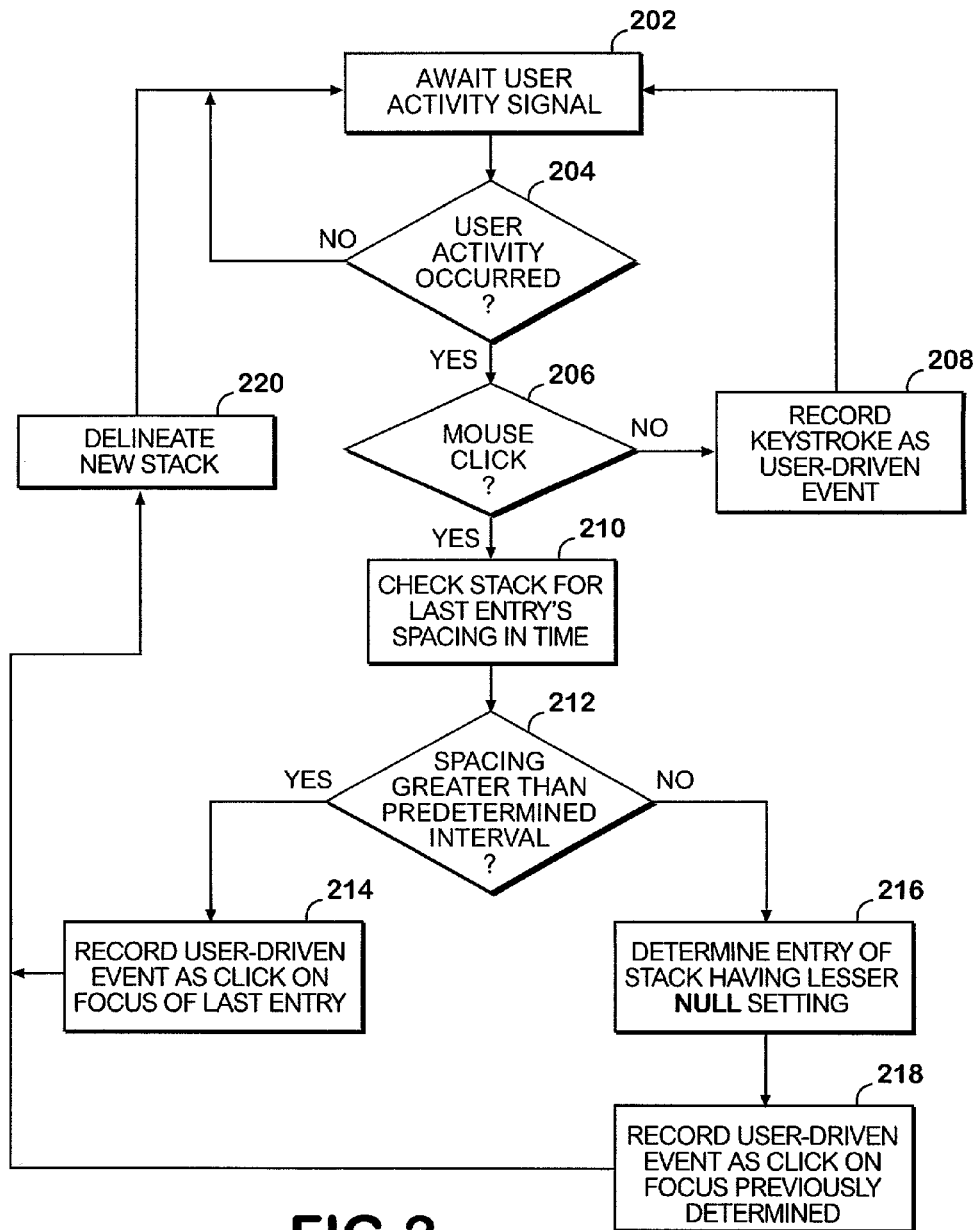
FIG. 2 shows exemplary logical operations for recording the user-driven events.

FIG. 2 shows the basic logical operations of the recorder application 128. The recorder application 128 provides the recording of the user-driven events occurring within the application program 126. The recorder application 128 may record the user-driven events in various manners such as sending text that describes the user-driven event to a window on the display screen 124 as shown in FIGS. 6–10 and/or by recording the description of the user-driven events to an electronic file in memory 114. These logical operations shown in FIG. 2 may be provided through a file that is executable by the CPU 104. However, in the embodiment shown, the executable file relies upon dynamic-link libraries also executed by the CPU 104 and whose logical operations are shown in FIGS. 3 and 4.

Figure 3:
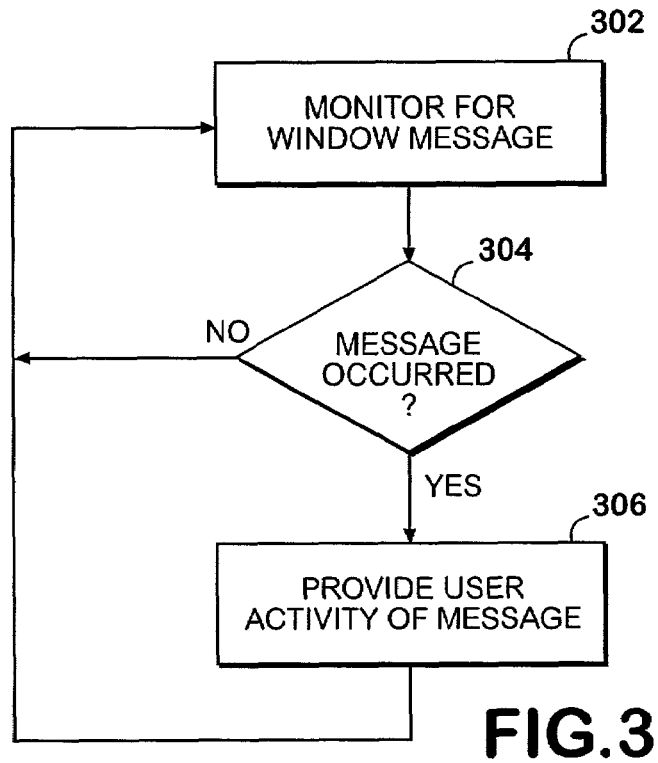
FIG. 3 shows exemplary logical operations for monitoring window messages utilized by the logical operations of FIG. 2.
Figure 4:
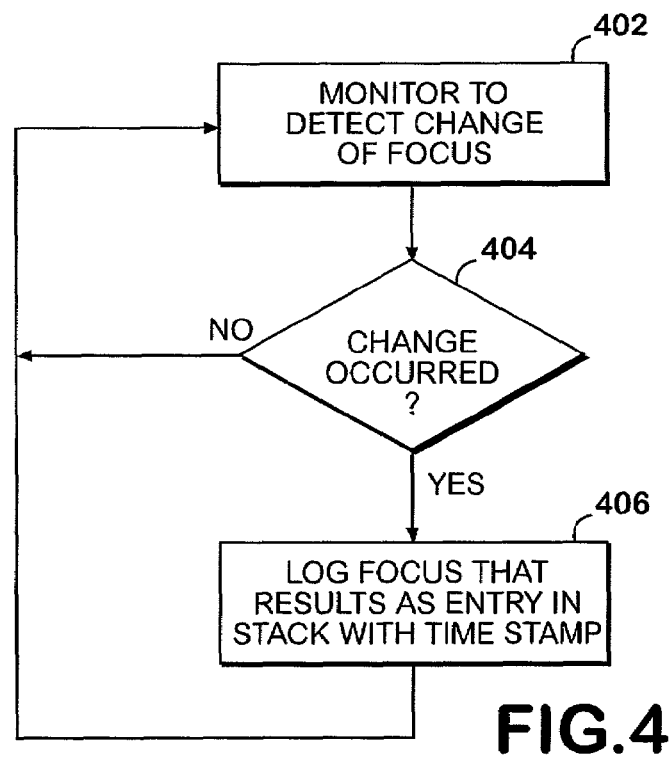
FIG. 4 shows exemplary logical operations for detecting changes of focus within the application and logging them to a stack in memory.
Figure 6:
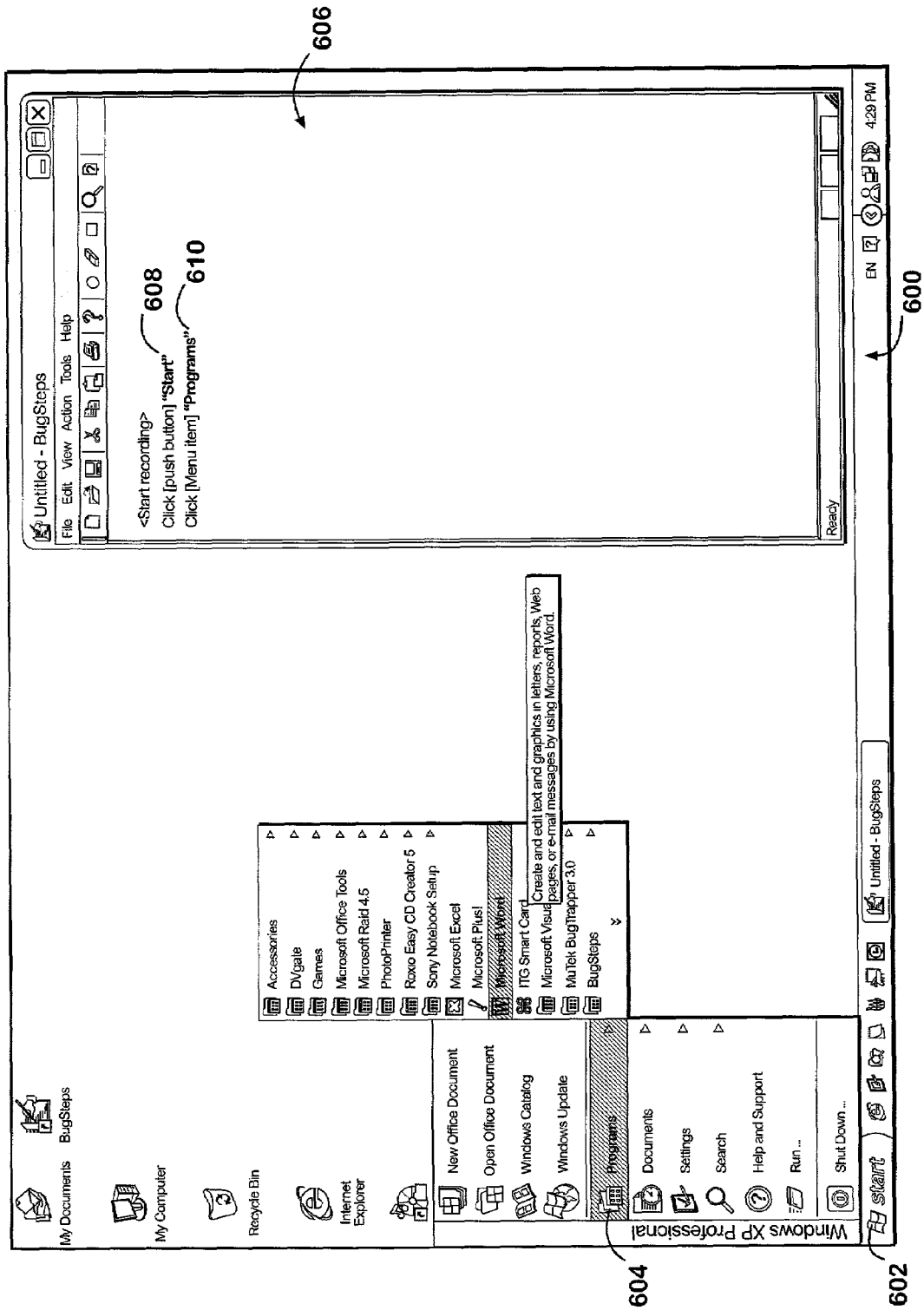
FIG. 6 is an exemplary screenshot showing recording to a display screen the user- driven events including a mouse click of a GUI "Start" push button and "Program" menu item.

The logical operations of the executable begin at signal operation 202 where the CPU 104 awaits a user activity signal that is provided from the logical operations of FIG. 3. The user activity signal specifies when a particular key on the keyboard has been pressed by the user and when a particular mouse button has been clicked by the user. Query operation 204 detects whether the signal has been received. If not, then signal operation 202 continues to await the user activity signal. If the signal of user activity has been received, then query operation 206 detects whether the signal specifies a mouse click as opposed to a keyboard type.

When a keyboard type is detected instead of a mouse click, then record operation 208 records the keyboard type as a user-driven event. As discussed, recording the user-driven event may involve one or more techniques, such as displaying a textual description of the keyboard type on the display screen, saving a description to an electronic file, and/or printing the textual description via a printer. Each character that is typed may be placed on the same line of the textual description as shown in the screenshots until the typed key is an <Enter> key or unless there is a control key such as <Backspace> or <Ctrl>+"A". After each keystroke is recorded, operational flow returns to signal operation 202.

When a mouse click is detected instead of a keyboard type, then operational flow transitions to stack operation 210. At stack operation 210, the CPU 104 references the stack 130 in storage 114 to obtain a time stamp for the last entry in the stack and a time stamp for the previous entry. As discussed below, the time stamp indicates the time when the focus of an entry was recorded to the stack upon the change of focus that occurs in the application program 126. The spacing in time of the last entry from the previous entry is determined by comparison of the time stamp of the last entry to the time stamp of the previous entry.

Query operation 212 detects whether the spacing in time of the last entry in the stack from the previous entry is greater than a pre-defined interval. It has been found that in some applications utilizing a GUI interface, there are focus entries that are recorded to the stack after the correct focus by the time the user performs the mouse click. It has also been found that a spacing of 0.3 seconds is a good indication that the last entry most likely contains the correct focus that should be recorded. If the last entry is spaced in time less than 0.3 seconds from the previous entry, then a previous entry may contain the correct focus instead. Therefore, for a particular application, either the focus of the last entry or a focus of a previous entry may be the correct focus to be recorded when the spacing is less than the pre-defined interval, such as less than 0.3 seconds.

When query operation 212 detects that the spacing is less than the pre-defined interval, then entry operation 216 determines which focus, either from the last entry or a preceding entry in the stack, has a lesser NULL setting or other indicative criteria specific to the application that signals which is most likely the correct focus. Once the entry with the correct focus is determined, record operation 218 records the user-driven event as a mouse click on that focus. When query operation 212 detects that the spacing is greater than or equal to the pre-defined interval, then record operation 214 records the user-driven event as a mouse click on the focus of the last entry in the stack. As discussed above, recording the user-driven event may involve displaying text describing the user-driven event on a display or printout and/or saving the description to an electronic file. After recording a mouse click event at record operation 214 or 218, a new stack is delineated at stack operation 220 and operational flow returns to signal operation 202.

FIG. 3 shows the logical operations of the CPU 104 executing the dynamic-link library that accesses window messages from the window of the application with focus to the operating system 116 of the computer 102. The window message specifies any user activity that has occurred such as a keyboard type or a mouse click. The logical operations begin by the CPU 104 monitoring for window messages from the application window at monitor operation 302. Query operation 304 detects whether a window message has been received. If not, then monitor operation 304 continues to monitor for a window message. If the message has occurred, then message operation 306 provides the user activity signal to the executable which was received at signal operation 202 of FIG. 2, and operational flow returns to monitor operation 302.

FIG. 4 shows the logical operations of the CPU 104 executing the dynamic-link library that communicates with the application program to obtain information defining the current focus of the application. These logical operations occur in parallel with the logical operations of FIG. 3. The logical operations begin at monitor operation 402 where the CPU 104 monitors for a change in focus, such as the mouse pointer moving to different objects within the GUI. The change in focus is indicated by communications with the application program 126, such as through the application program interface IAccessible( ).

Query operation 404 detects whether a change in focus has occurred. If not, the monitor operation 402 continues monitoring to detect a change. Once a change in focus is detected, log operation 406 logs the focus information into an entry in the stack 130 along with a time stamp from the system clock. The focus information received from the application program may include one or more types of data to describe the focus. The name of the control object where the mouse pointer is located may be provided, such as "Format". Also, the type of control object may be provided such as [Menu Item]. Other pieces of information may also be included, such as an identification of the parent application, an indication of the coordinates of the mouse pointer, and an identification of the window having focus. Once the one or more types of data describing the focus are logged as an entry to the stack 130 with a time stamp, operational flow returns to monitor operation 402.

FIG. 5 shows a table 500 that demonstrates the structure of stack 130 along side a list of user activity 504 taken from the window messages and a list of resulting user-driven event recordings 506. The focus entries of the stack 502, the user activities 504, and the resulting recordings 506 coincide with the exemplary screenshots discussed below starting with the user-driven events that appear in FIGS. 7–10. As shown in screenshot 600 of FIG. 6, the user has activated the recording application 128 which in this embodiment provides a window 606 to display the user-driven events as text. The user clicks the Start button 602 and Click[push button] "Start" is reported as the user-driven event at line 608. The user then selects the "Programs" menu item 604, and Click [Menu Item] "Programs" is reported at line 610.

Figure 7:
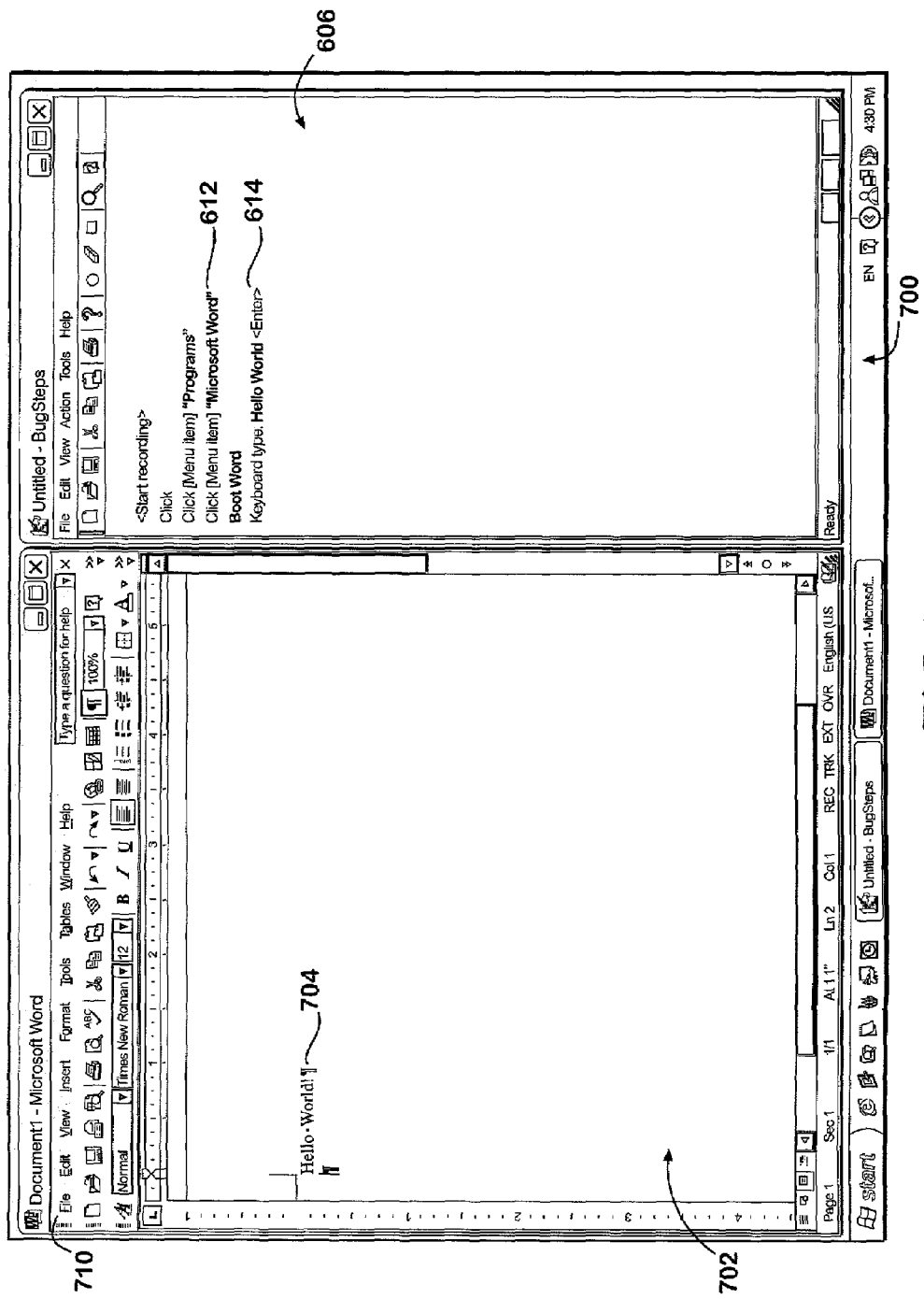
FIG. 7 is an exemplary screenshot showing recording to a display screen the user-driven events including typing Hello World followed by the <Enter> key within a word processing program.
Figure 8:
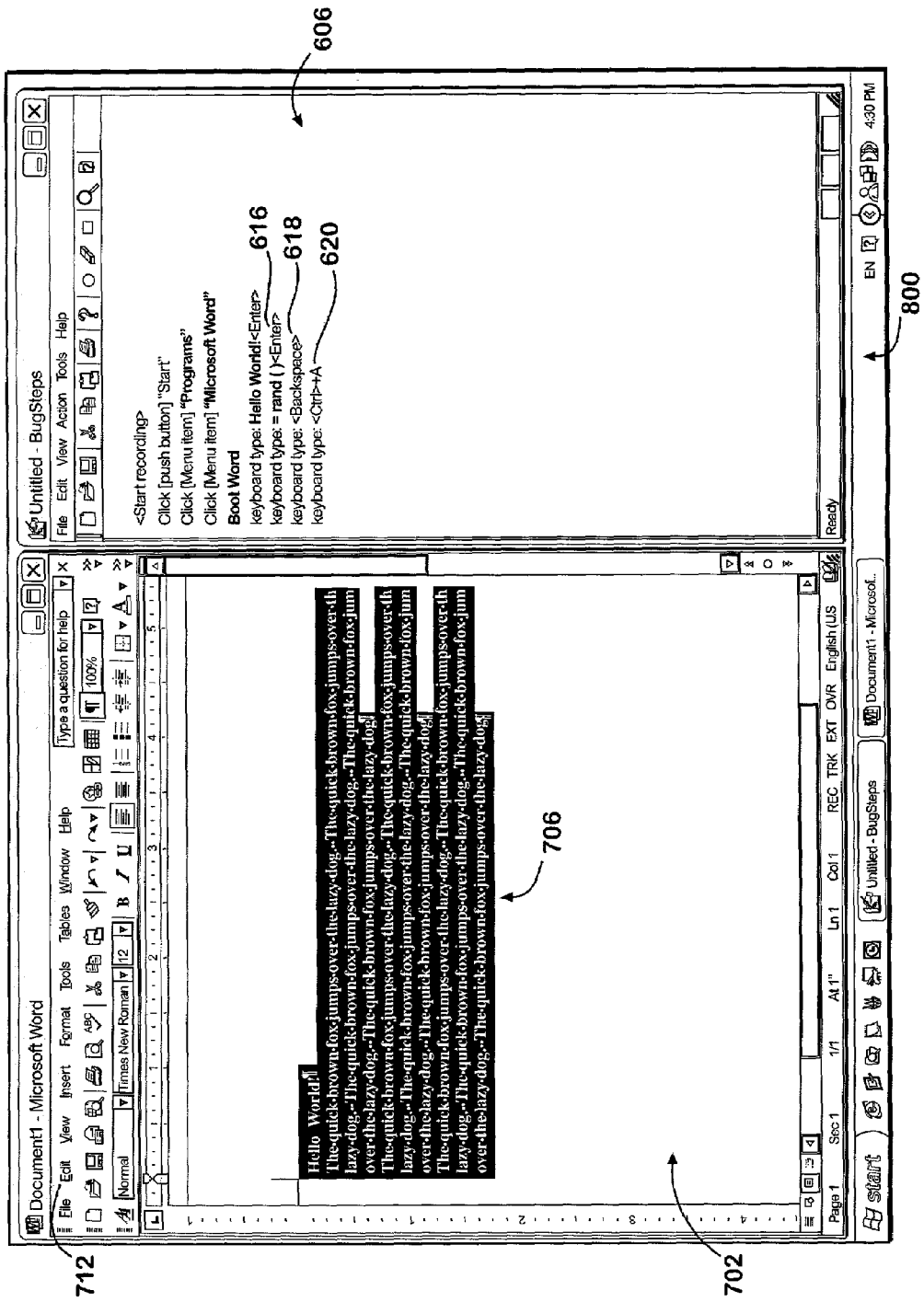
FIG. 8 is an exemplary screenshot showing recording to a display screen the user-driven events including typing =rand( ) followed by the <Enter> key and then the <Backspace> key and the <Ctrl> key plus <A>.
Figure 9:
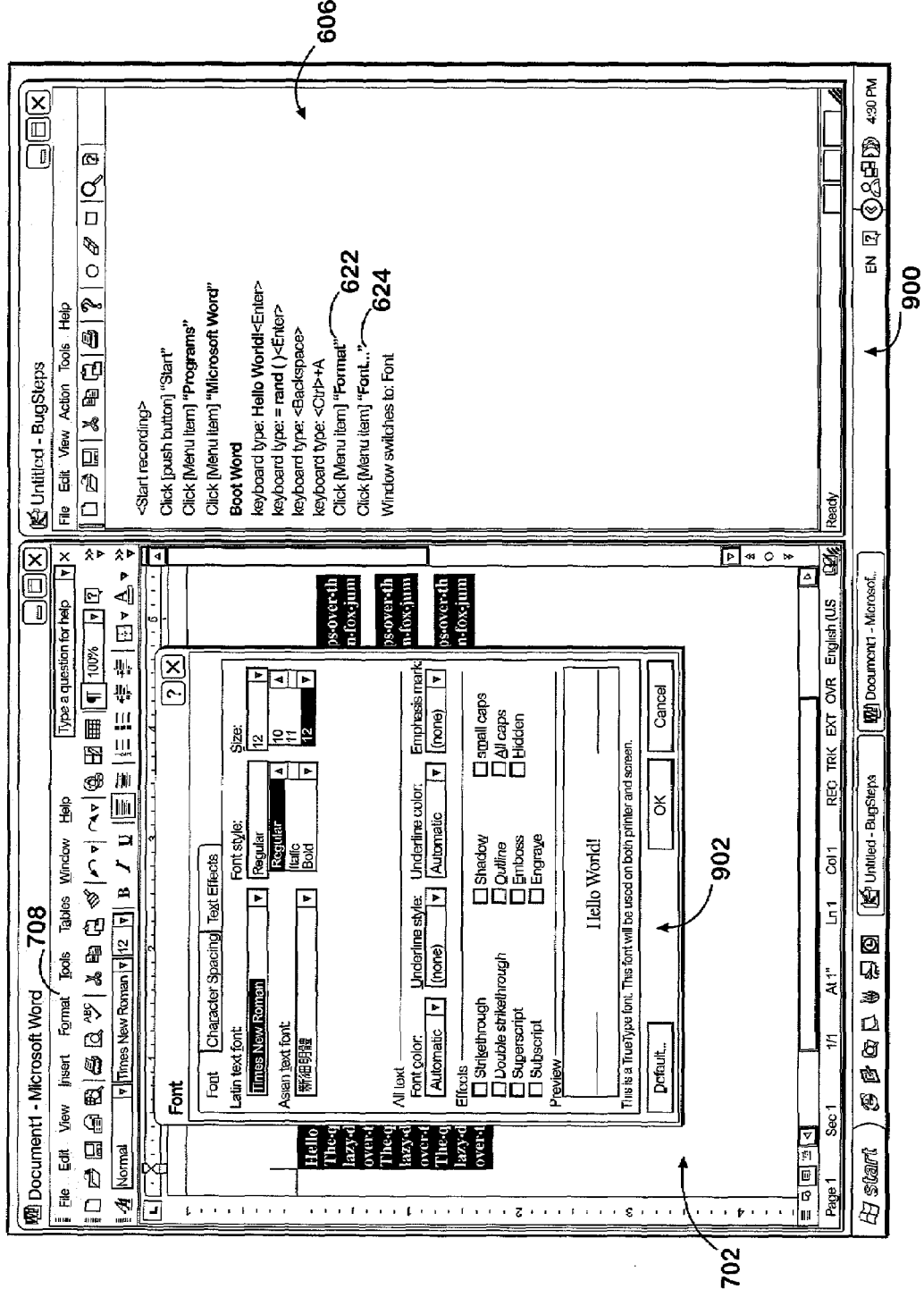
FIG. 9 is an exemplary screenshot showing recording to a display screen the user-driven events including a mouse click of a GUI "Format" menu item followed by a mouse click of a GUI "Font" menu item.

As shown in the screenshot 700 of FIG. 7, the user then opens a word processor application program 126 that provides a window 702. With reference to the table 500 of FIG. 5, a set 508 of stack entries includes the focus 'File' menu item that results when the mouse pointer is positioned over the 'File' menu item 710 at time 1:42.1 without later clicking the mouse button. Thereafter, but before the mouse pointer is moved to a new position, the user types Hello World! and presses the <Enter> key, and the application program 126 displays the text at line 704. Through the logical operations discussed above, the user-driven event is recorded as Keyboard type: Hello World!<Enter> as displayed at line 614 in FIG. 7, and no focus of the GUI is specified in the displayed recording because the user-driven event did not involve a mouse click.

After typing this phrase but before moving the mouse pointer, the user types= rand( ) and presses the <Enter> key. The application 126 responds by inserting the text 706. The user-driven event is recorded as Keyboard type: =rand( )<Enter> as displayed at line 616 in screenshot 800 of FIG. 8. The user in this example then moves the mouse pointer to the "Edit" menu item 712 at time 1:52.3 without later clicking the mouse button. Thereafter, the user presses the <Backspace> key to bring the cursor back to the end of text 706. The user-driven event is recorded as Keyboard type: <Backspace> as displayed at line 618.

The user now wishes to select all of the text 706 so the user presses the combination of the <Ctrl> key and the <A> key. The user-driven event is recorded as Keyboard type: <Ctrl>+A as displayed at line 620. The user then moves the mouse pointer over a "Format" menu item 708 shown in screenshot 900 of FIG. 9 at time 1:55.8. The user then clicks the mouse button to select the "Format" menu item. The user-driven event is recorded as Click[Menu Item] "Format" at line 622, which specifies the activity of clicking along with the focus which is the "Format" menu item. The "Format" focus at this point is the last entry in the stack 508, and it is spaced in time from the previous entry by 3.5 seconds which is greater than the pre-defined interval. Therefore, the last entry can be used as the correct focus for the mouse click.

After clicking the "Format" menu item, the user moves the mouse pointer to a "Font" menu item provided in response to the mouse click. Therefore, the focus of the new stack 510 becomes the "Font" menu item at time 1:57.2. The user then clicks the mouse button to select the "Font" menu item. The user-driven event is recorded as Click[Menu item] "Font . . . " at line 624, which specifies the activity of clicking along with the focus which is the "Font" menu item. The "Font" focus at this point is the last entry in the stack 510 and there is no other entry with a time stamp to compare to so it as the last entry can be used as the correct focus of the user-driven event. The window switches to the "Font" child window 902.

Figure 10:
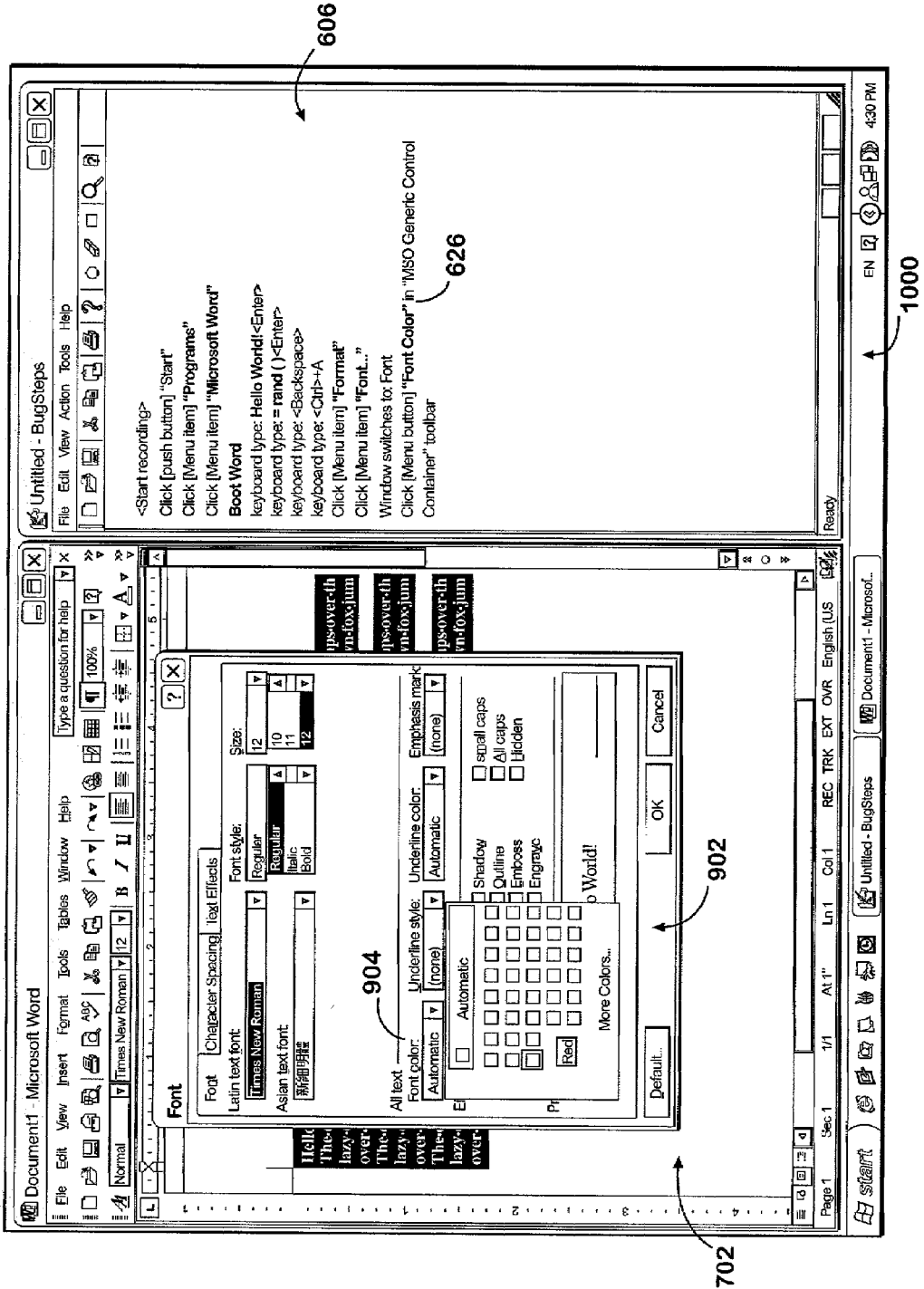
FIG. 10 is an exemplary screenshot showing recording to a display screen the user-driven events including a mouse click of a GUI "Font Color" menu button.

After clicking the "Font" menu item, the user moves the mouse pointer to a "Font Color" menu button 904 of the child window 902 as shown in screenshot 1000 of FIG. 10. The "Font Color" menu button focus is entered in stack 510 at time 1:59.5. Prior to clicking the mouse button, the application in this example has an artifact that reports an additional change of focus to X menu button even though the mouse pointer is still over the "Font Color" menu button 904 when the mouse is clicked. The X button is entered into the stack at time 1:59.6, where the X button may be one of several menu buttons or other potential points of focus within the GUI of the application. The X button artifact may or may not be present, depending upon the particular application. The X button will most likely occur for specific user interface controls within the Microsoft® Office suite of applications, and it is not a generic Win32 user interface item.

The user-driven event is recorded as Click[Menu button] "Font Color" as displayed at line 626, rather than incorrectly specifying the X button as the focus, because the time stamp for the last entry occurred less than the pre-defined interval from the previous time stamp. In this example, the pre-defined interval is 0.3 seconds and the last entry occurred only 0.1 seconds after the previous entry, and the X menu button has a NULL setting as specified for the application that is greater than the NULL setting for the "Font Color" menu button. Therefore, the "Font Color" menu button is obtained from the stack 512 as the correct focus for the mouse click and is recorded as the user-driven event. Thereafter, the recording of user-driven events continues with a new stack 514 and so on until the user stops using the recording application 128 or until the application 126 malfunctions.

If the application 126 malfunctions, the user or another who wishes to reproduce the malfunction to debug the application 126 can follow the user-driven events specified in the window 606. The recorded user-driven events of the window 606 may be printed or electronically transferred as a file to a remote location, such as a database that maintains the user-driven events necessary to reproduce bugs for an application 126.

Thus, it can be seen from the discussion of the foregoing embodiments that user- driven events ocurring within an application may be recorded. These embodiments provide recording without access to source code of the applications so that any user can record the events. Furthermore, the user need not specially set up a computer, such as by utilizing implementation, debugging, and compiling software and settings for such recording but merely run the recorder application program 128. From these embodiments, it can also be seen that the recorder application 128 may be provided such that its operation does not overly tax system resources and does not slow system response to user actions.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of recording user-driven events occurring for a computer running an application within a window of a graphical user interface, comprising:
    detecting each change of focus of the application within the graphical user interface;
    logging an entry for a focus that results from each change of focus;
    while detecting each change of focus, monitoring for a window message signifying user activity;
    when a window message occurs, obtaining the focus of an entry previously logged; and
    recording the obtained focus in association with the user activity of the window message to specify the user-driven event.

2. The method of claim 1, wherein logging an entry comprises storing a description of each focus with a time stamp indicating when the change of focus occurred.

3. The method of claim 2, wherein obtaining a focus comprises determining whether a focus of an entry that was logged last prior to the window message occurred after a pre-defined interval from when a previous entry occurred through review of the time stamps, and when the focus of the entry that was logged last occurred after the pre-defined interval, then obtaining the focus of the entry that was logged last.

4. The method of claim 3, wherein when the focus of the entry that was logged last did not occur after the pre-defined interval, then the method further comprises determining whether to obtain a focus of the last entry or a focus of an entry that was logged before the last entry.

5. The method of claim 1, wherein recording the obtained focus in association with the user activity of the window message comprises displaying text describing the obtained focus and the user activity.

6. The method of claim 1, wherein the obtained focus comprises a menu button and the user activity comprises a mouse click.

7. The method of claim 1, further comprising when the user activity is a keyboard type, then only recording from the window message the keyboard type to specify the user-driven event.

8. The method of claim 1, further comprising after recording the user-driven event, repeating each step of the method to record subsequent user-driven events until the application malfunctions to create a log of user-driven events responsible for the malfunction.

9. A computer that records user-driven events occurring for an application within a window of a graphical user interface, comprising:
  a memory;
  a processor that executes the application and the graphical user interface, the processor being configured to:
    detect changes of focus of the application and record a focus resulting from each change as an entry to memory,
    monitor for a window message specifying user activity while detecting the changes of focus,
    when a window message occurs, specify the user-driven event by recording the user activity of the message and also recording a focus of an entry stored in memory.

10. The computer of claim 9, further comprising a display, wherein the processor is further configured to specify the user-driven event by displaying text describing the user activity.

11. The computer of claim 10, wherein the processor is further configured to specify the user-driven event by displaying text describing the recorded focus.

12. The computer of claim 9, further comprising a clock, and wherein the processor is further configured to store a time stamp from the clock with each entry that is stored to indicate when the change of focus occurred.

13. The computer of claim 12, wherein the processor is configured to record a focus of an entry stored in memory by determining whether the focus of the last entry stored prior to the window message occurring occurred after a pre-defined interval from when a previous entry occurred as determined from the time stamps in memory.

14. The computer of claim 13, wherein the processor is configured to record the focus of the last entry when the focus of the last entry occurred after the pre-defined interval and otherwise determine whether to record the focus of the last entry or an entry that occurred before the last entry.

15. A computer readable medium that contains computer executable instructions for performing the steps of:
  detecting a change of focus of an application within a graphical user interface;
  logging a focus resulting from each change of focus that occurs as an entry to memory;
  while detecting the changes of focus, monitoring for window messages signifying user activity;
  when a window message occurs, determining whether the window message indicates a mouse click or a keyboard type;
  when a mouse click is indicated, obtaining a focus of an entry previously logged and recording the obtained focus in association with the user activity of the window message to specify the user-driven event.

16. The computer readable medium of claim 15, further comprising when a keyboard type is indicated, recording the keyboard type indicated by the interface message to specify the user-driven event.

17. The computer readable medium of claim 15, wherein recording the obtained focus in association with the user activity comprises generating a display of text describing the obtained focus and the user activity.

18. The computer readable medium of claim 15, wherein obtaining a focus of an entry previously logged comprises obtaining a focus logged last prior to the window message occurring.

19. The computer readable medium of claim 15, wherein logging the focus resulting from each change further comprises logging a time stamp indicating when the change of focus occurred.

20. The computer readable medium of claim 19, wherein obtaining a focus of an entry previously logged further comprises determining whether a focus of an entry that was logged last prior to the window message occurred after a pre-defined interval from when a previous entry occurred through review of the time stamps, and when the focus of the entry that was logged last occurred after the pre-defined interval, then obtaining the focus of the entry that was logged last.

* * * * *